(12) United States Patent
Pickrell et al.

(10) Patent No.: US 6,235,665 B1
(45) Date of Patent: May 22, 2001

(54) POROUS CERAMIC ARTICLES

(75) Inventors: Gary R. Pickrell, Travelers Rest, SC (US); Kenneth R. Butcher, Hendersonville, NC (US)

(73) Assignee: Porvair Corporation, Hendersonville, NC (US)

( * ) Notice: Subject to any disclaimer, the term of this patent is extended or adjusted under 35 U.S.C. 154(b) by 0 days.

(21) Appl. No.: 09/372,441

(22) Filed: Aug. 11, 1999

Related U.S. Application Data

(62) Division of application No. 08/825,629, filed on Mar. 31, 1997.

(51) Int. Cl.[7] ............ C04B 35/10; C04B 35/56; C04B 35/58
(52) U.S. Cl. ............ 501/9; 501/80; 501/81; 501/88; 501/97.1; 501/125; 501/127; 501/128
(58) Field of Search ................. 501/80, 81, 105, 501/9, 88, 97.1, 125, 127, 128

(56) References Cited

U.S. PATENT DOCUMENTS

| | | |
|---|---|---|
| H48 | 4/1986 | Heichel . |
| 2,797,201 | 6/1957 | Veatch et al. . |
| 2,996,389 | 8/1961 | Fernhof . |
| 3,888,691 | 6/1975 | Villani et al. . |
| 3,892,580 * | 7/1975 | Messing . |
| 3,899,555 | 8/1975 | Takao et al. . |
| 4,056,586 * | 11/1977 | Pryor et al. .............. 264/44 |
| 4,307,051 | 12/1981 | Sargeant et al. . |
| 4,357,165 | 11/1982 | Helferich et al. . |
| 4,404,291 * | 9/1983 | Kiefer et al. ............. 501/81 |
| 4,432,798 | 2/1984 | Helferich et al. . |
| 4,707,311 | 11/1987 | Okazaki . |
| 4,760,038 * | 7/1988 | Kinney, Jr. et al. ........ 501/105 |
| 4,777,153 | 10/1988 | Sonuparlak et al. . |
| 4,812,424 | 3/1989 | Helferich et al. . |
| 4,814,300 | 3/1989 | Helferich . |
| 4,839,049 * | 6/1989 | Kinney, Jr. et al. ........ 210/510.1 |
| 4,846,906 | 7/1989 | Helferich et al. . |
| 4,871,495 | 10/1989 | Helferich et al. . |
| 4,878,947 | 11/1989 | Helferich . |
| 4,889,670 | 12/1989 | Gurak et al. . |
| 4,923,487 | 5/1990 | Bogart et al. . |

(List continued on next page.)

FOREIGN PATENT DOCUMENTS

| | | |
|---|---|---|
| 31 03 751 A1 | 8/1982 | (DE) . |
| 42 08 155 A1 | 9/1993 | (DE) . |
| 0 598 783 B1 | 12/1995 | (EP) . |
| 1005431 | 9/1965 | (GB) . |
| 57-98641 | 6/1982 | (JP) . |
| 1063568 * | 4/1986 | (JP) . |
| 62-170440 | 7/1987 | (JP) . |
| 3228883 | 10/1991 | (JP) . |
| 07232974 | 9/1995 | (JP) . |
| WO 93/04013 | 3/1993 | (WO) . |

OTHER PUBLICATIONS

Ichinose N., Introduction to Fine Ceramics, Keytc, Great britain, 1983, pp. 18–20.

*Primary Examiner*—Paul Marcantoni
(74) *Attorney, Agent, or Firm*—Carter & Schnedler, P.A.

(57) ABSTRACT

An improved porous ceramic article and a method for forming such porous ceramic article. A mixture of ceramic particles and pliable organic hollow spheres is prepared in a liquid, typically as a suspension. The article is formed by pressing, slip casting, extruding or injection molding the mixture. The article is dried to remove the liquid, and then is fired so that the ceramic particles are bonded such as by sintering, and the organic spheres are burned off, resulting in a strong porous ceramic article having uniformly spaced interconnected voids.

6 Claims, 1 Drawing Sheet

U.S. PATENT DOCUMENTS

| | | |
|---|---|---|
| 4,963,515 | 10/1990 | Helferich . |
| 4,976,760 | 12/1990 | Helferich et al. . |
| 5,045,511 * | 9/1991 | Bosomworth et al. ................ 501/85 |
| 5,110,675 | 5/1992 | Newkirk . |
| 5,171,720 | 12/1992 | Kawakami . |
| 5,279,737 * | 1/1994 | Sekhar ................................ 210/490 |
| 5,441,919 | 8/1995 | Park et al. . |
| 5,443,603 | 8/1995 | Kirkendall . |
| 5,563,212 | 10/1996 | Dismukes et al. . |
| 5,571,848 | 11/1996 | Mortensen et al. . |
| 5,580,832 | 12/1996 | Malghan et al. . |

* cited by examiner

POROUS CERAMIC ARTICLES

This Application is a division of 08/825,629 Mar. 31, 1997.

BACKGROUND OF THE INVENTION

This invention relates to the formation of ceramic articles. More particularly, it relates to the formation of porous ceramic articles.

In the production of ceramic materials for use in refractory, kiln furniture, filtration, catalytic, bone implants and other applications, it is sometimes desired to reduce the overall density of the fabricated article by introducing porosity into the article during or after fabrication. The strategy employed for reducing the mass of the article after fabrication usually involves removal of material from the article by means of grinding, drilling, routing or other mechanical methods to physically remove material from selected locations. This usually takes the form of drilling holes, routing channels, etc. Reducing the mass of the material (per unit volume of space occupied by the fabricated article) during fabrication involves using a process which introduces porosity into the ceramic. This can be accomplished by various methods described in the literature.

Some of the basic patents assigned to Selee Corporation, assignee of the present invention, disclose a method to produce a ceramic article with a high volume percent interconnected porosity by impregnating a reticulated polyurethane foam with a ceramic slurry and heating to burn of the polymer and sinter the ceramic. This method can be used to produce various pore sizes and densities. The reported strengths for various ceramic materials fabricated in this manner lie in the 500–700 psi range.

Another method to produce low density ceramic kiln furniture is taught in U.S. Pat. No. 4,812,424, whereby a porous aluminosilicate refractory aggregate is fired. The aluminum metal, alkali silicate and alkali aluminate chemical reaction producing a large volume of small gas bubbles is combined with a sodium silicate-sodium aluminate hydrogel setting reaction which traps the hydrogen gas bubbles in the ceramic. The strengths of this material are approximately in the 500–1000 psi range.

U.S. Pat. Nos. 4,814,300, 4,846,906, 4,871,495, 4,878,947, 4,923,487, 4,963,515 and 4,976,760 are extensions of this basic technology to include membranes and are used in specific markets, such as diesel particulate traps and diesel filters.

European Patent Specification Publication No. EP 0 598 783 B1 discloses a method of preparing porous refractory articles by forming a dispersion comprising particles in a liquid carrier, introducing gas into the dispersion and removing the liquid carrier to provide a solid article having pores derived from the bubbles.

U.S. Pat. No. 4,889,670 discloses a method to produce porous ceramic parts by combining a mixture of 60–90 weight percent of a particulate ceramic with 10–40 weight percent of a latex polymer, whereby the mixture is frothed by mechanical means, shaped, set and sintered to produce the porous article.

It is also well known that porosity can be introduced into a ceramic article by incorporating various types of organic particles into the ceramic body. Upon firing, these particles are oxidized and leave behind voids in the material.

OBJECTS OF THE INVENTION

It is therefore one object of this invention to provide an improved method to produce porous ceramic articles which are stronger, more thermally shock resistant, possesses uniformly dispersed and highly controlled pore sizes, and which can be made more quickly and economically than presently available techniques.

It is another object of this invention to provide an improved method to produce porous ceramic articles so that the size and size range of the pores, and the size and size range of the interconnections between the pores, can be more closely controlled than with currently available techniques.

It is still another object of this invention to provide an improved method to produce porous ceramic articles so that the volume percent of the porosity and the distribution of pores throughout the articles can be closely controlled.

It is yet another object to provide a method for producing a coated porous ceramic article which will retain its coating through a large number of thermal cycles.

It is further another object of this invention to provide an improved method to produce porous ceramic articles so that the porosity extends to and through the surface of the articles rather than forming a solid skin on the surface.

It is another object to provide a porous ceramic article in accordance with the above methods.

SUMMARY OF THE INVENTION

In accordance with one form of this invention, there is provided a method for forming a porous ceramic article. A mixture of ceramic particles and pliable organic spheres is prepared in a liquid. Preferably, a suspension of the ceramic particles and pliable organic spheres is formed. Preferably, the spheres are hollow and are made of a polymer, such as acrylic. The mixture is formed into a shaped article. The shaped article is dried. The shaped article is then fired so that the ceramic particles are bonded such as by sintering, and the pliable organic spheres are burned off, resulting in voids in the shaped article.

In accordance with another form of this invention, there is provided another method for producing porous ceramic articles. A suspension of ceramic articles and pliable organic hollow spheres are formed such that the ceramic articles and pliable hollow polymer spheres are simultaneously suspended in a liquid, preferably comprising water. A shaped article is formed after a sufficient amount of water is added. A shaped article is formed by either slip casting, pressing, extrusion, or injection molding. The shaped article is dried to remove the water. The shaped article is then fired to allow bonding of the ceramic particles such as by sintering, and to burn off the pliable organic hollow spheres, resulting in uniformly distributed voids in the shaped article.

A range of porosities of up to 95% void volume may be achieved using these methods. The size of the voids may be preselected by selecting the appropriate size polymer spheres. The amount of porosity is easily controlled by the number of polymer spheres which are added. The size range of the pores can be closely controlled by controlling the size range of the polymer spheres which are used. The distribution of the pores in the ceramic is highly uniform due to the fact that the polymer spheres in the ceramic particles are preferably simultaneously suspended by the addition of the appropriate suspending agent.

The article may be coated, for example with another ceramic composition. It has been found that the coating will stay bonded to the article through a large number of thermal cycles. Similar coatings on other substrates do not adhere as well.

In accordance with another form of this invention, there is provided a porous ceramic article having a plurality of substantially spherical shaped voids. The voids are substantially uniformly dispersed throughout the article. The voids are interconnected with one another. For an article having a theoretical density in the range from 5% to 30%, the strength of the article is in the range from 700 psi to 4500 psi.

In another form of this invention, there is provided a porous ceramic article having a plurality of substantially spherical shaped voids therein. The voids are substantially uniformly dispersed throughout the article. The voids are interconnected with one another. A substantial number of the voids intersect with at least one adjacent void. A window is formed by the intersection. The window is substantially in the shape of a circle. The average diameter of the circle is in the range from approximately 11 microns to 22 microns.

In accordance with another form of this invention, there is provided a porous ceramic article having a plurality of substantially spherical shaped voids therein. The voids are substantially uniformly dispersed throughout the article. The voids are interconnected with one another. At least a portion of the article is coated. The coating may comprise a ceramic composition, such as zirconia. The coating will remain adhered to the article for at least ten thermal cycles. The preferred thermal cycle is from approximately room temperature to approximately 2200° F. and back to approximately room temperature in approximately 2 hours.

BRIEF DESCRIPTION OF THE DRAWINGS

The subject matter which is regarded as the invention is set forth in the appended claims. The invention itself, however, together with further objects and advantages thereof may be better understood in reference to the accompanying drawings in which:

DESCRIPTION OF THE PREFERRED EMBODIMENTS

Figure 1:
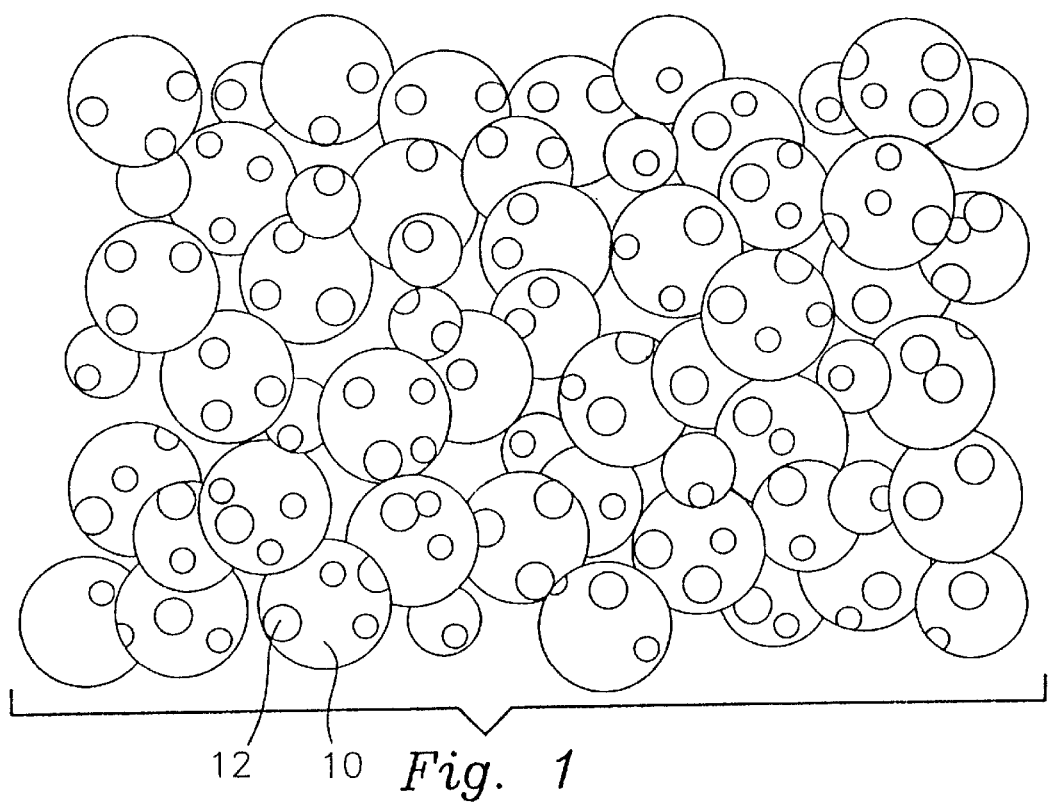
FIG. 1 is a sectional view of a portion of an article made in accordance with the subject invention, with the exposed side having been polished.

Porous ceramic articles were formed in accordance with the teaching of the invention as set forth in Examples 1–5 below.

EXAMPLE 1

A highly porous zirconia toughened alumina article was prepared by mixing 8.4 weight percent zirconia, 18.2 weight percent alumina with 16.1 weight percent water, 1.2 weight percent nitric acid, 4.3 weight percent starch, 1.1 weight percent petroleum jelly, and 0.8 weight percent pliable hollow polymer spheres. The average size of the spheres was 100 microns. These constituents were mixed in a Hobart mixer forming a paste with the consistency of bread dough. This mixture was then shaped by pressing in a mold, removed, dried and fired to form the porous ceramic article. The fired article was composed of 72% void volume. The average void size was approximately 100 microns and the voids were very uniformly distributed across the article. Scanning electron microscopy of the article revealed that the pores were highly connected. The average modulus of rupture of these articles with 72% void volume was approximately 4000 psi. Articles of this material have been cycled from room temperature to 2200° F. and back to room temperature in 1.75 hours. The dimensions of the article was approximately 3.25"×2.5"×0.25". After 100 of these thermal cycles, the average strength was still 4000 psi. This demonstrates the excellent thermal shock resistance of these materials. The ability of this material to be shaped in the green state by pressing in molds allows the readily available automatic forming equipment to be used to fabricate the desired articles. These automatic forming equipment not only allow parts to be molded in a short period of time, but also allow very economical production of the parts.

EXAMPLE 2

In another instance, the same procedure was used as in Example 1, except that the weight percent of pliable hollow polymer spheres which were used was increased. The resulting article was composed of 82% void volume with the result in the strength of approximately 2500 psi.

EXAMPLE 3

In another instance, the same procedure was used as in Example 2, except that the weight percent of pliable hollow polymer spheres were increased. The resulting article was composed of 88% void volume with the result in the strength of approximately 1500 psi.

EXAMPLE 4

A highly porous zirconia toughened alumina article was prepared by mixing 8.8 weight percent zirconia, 72 weight percent alumina with 17 weight percent water, 1.3 weight percent nitric acid, and 0.84 weight percent pliable hollow polymer spheres, and 0.1 weight percent of a defoaming agent. Additional water was then added to produce a slurry suitable for slip casting in plaster of paris molds using traditional slip casting techniques. Articles were formed by pouring the slip prepared as above in the plaster of paris molds and allowing suitable time for the molds to absorb the water. The cast parts were then taken from the mold, dried and fired. The average strength of these articles with 72% void volume was approximately 4000 psi. In general, all the physical properties were the same as those described for the pressed material described in Example 1.

EXAMPLE 5

A highly porous zirconia toughened mullite article was prepared by mixing 38.4 weight percent zircon (zirconium silicate), 44.6 weight percent alumina with 15 weight percent water, 1 weight percent nitric acid, 1 weight percent pliable hollow polymer spheres, and 0.01 weight percent of a defoaming agent. The amount of water added was sufficient to produce a slurry suitable for slip casting in plaster of paris molds using traditional slip casting techniques. Articles were formed by pouring the slip prepared as above in the plaster of paris molds and allowing suitable time for the molds to absorb the water. The cast parts were then taken from the mold, dried and fired. The articles formed were composed of approximately 70% void volume space.

EXAMPLE 6

In another instance, solid substantially non-pliable polymer spheres of approximately the same average size as the pliable hollow polymer spheres mentioned in Examples 1–5 were used as a comparison. These solid spheres, which are very hard, were mixed in exactly the same manner as Example 1, except the solid spheres were substituted for the hollow spheres (equal volume percentages of solid spheres were substituted for the hollow spheres to maintain the same fired density). The bodies were dried and fired in exactly the same manner as in Example 1. The measured MOR (strengths) of the sintered body using the solid spheres was only 1350 psi. As a comparison, this is only about one-third to one-half of the strengths obtained when using the pliable hollow spheres.

EXAMPLE 7

In another instance, a commonly used organic filler material, walnut flour, was used in place of the pliable hollow spheres. The proper amount of the walnut flour was determined which would give the same fired density articles as obtained in Example 1. The procedure followed was exactly the same as in Example 1, except the walnut flour was substituted for the pliable hollow spheres and additional water had to be added to make a body suitable for pressing. The articles made in this manner were dried and fired as in Example 1. The resulting articles underwent approximately 5 times the amount of shrinkage as those in Example 1 and were too weak to allow MOR testing to be performed.

DISCUSSION

The preferred range for the volume percent of the hollow pliable polymer sphere for a porous article is between 50% and 95% void volume.

The preferred range for the size of the pliable hollow polymer spheres is between 1 micron and 1000 microns.

As can be seen by comparing the articles which were obtained by Examples 6 and 7 to those of the invention set forth in Examples 1–5, it is clear that the invention produces far superior ceramic articles. It is believed that the ceramic articles produced by the invention are stronger primarily because cracks do not form during the drying process, which it is believed is due to the fact that the pliable hollow spheres deform when the ceramic matrix contracts during drying. This deformation does not occur when one uses hard solid substantially non-pliable spheres, as indicated in Example 6. It is believed that the strength of an article produced in accordance with this invention is in the range of 700 psi for a 5% theoretical density to 4500 psi for a 30% theoretical density. The strength is measured by supporting the article at the ends thereof and applying a force to the top of the article until the article breaks. Thus the ceramic articles produced by the invention have been shown to be much stronger than the prior art.

In addition, it is believed that the use of pliable hollow spheres enables paths between the resultant spherical voids to occur with more certainty because the adjacent hollow spheres do not have a mere single point of contact, as do hard spheres, but have a substantial area of contact so that connections between the resultant voids are more likely when the adjacent spheres deform.

Referring more particularly to FIG. 1, each spherical void 10 includes at least one substantially circular window 12 formed by the intersection of an adjacent spherical void 10. The average diameter of the circular windows 12 is in the range from approximately 11 microns to 22 microns.

Figure 2:
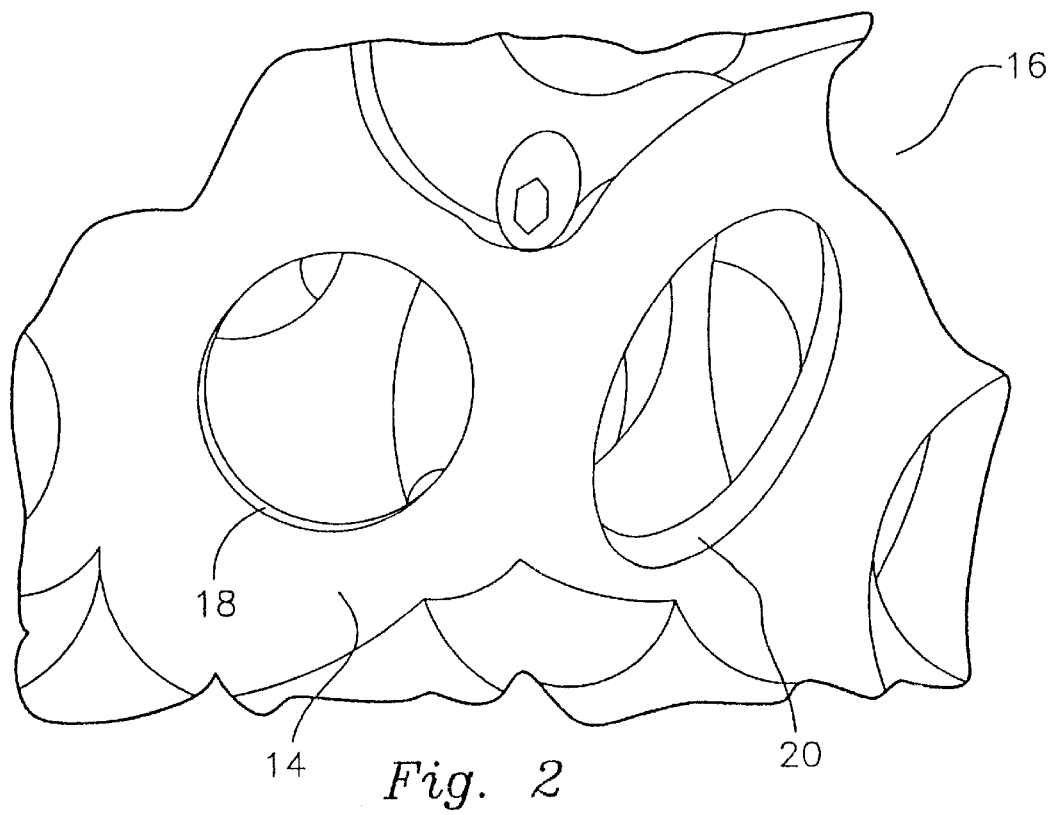
FIG. 2 shows a portion of FIG. 1, which has been magnified.

FIG. 2 shows intersecting spherical voids 14 and 16 having windows 18 and 20, respectively. The windows formed by the intersection of spherical voids 14 and 16 are hidden from view.

The article may have a coating applied. A coating is sometimes desirable for non-reactivity, hardness, impermeability, pore size control, and other characteristics. The coating may comprise a ceramic composition, such as zirconia. It has been found that a coating, when applied to the articles of the subject invention, will remain adhered to the article over a large number of thermal cycles, compared to prior art articles which have been similarly coated. It has been found that the coating began to peel off prior art articles after less than ten thermal cycles from approximately room temperature to approximately 2200° F. and back to approximately room temperature in approximately 2 hours. On the other hand, it has been found that the coating on an article of the subject invention remained adhered to the article after over 100 thermal cycles from approximately room temperature to approximately 2200° F. and back to approximately room temperature in approximately 2 hours.

From the foregoing description of the preferred embodiments of the invention, it will be apparent that many modifications may be made therein. For example, porous articles can be made using other ceramic compositions, such as oxides, carbides or nitrides of silicon, aluminum and zirconium, as well as mullite, cordierite or a mixture thereof. It will be understood, however, that the embodiments of the invention are exemplifications of the invention only and that the invention is not limited thereto. It is to be understood, therefore, that it is intended in the appended claims to cover all modifications as fall within the true spirit and scope of the invention.

What is claimed is:

1. A porous ceramic article comprising:

a ceramic article having a plurality of substantially spherical shaped voids therein; said voids being substantially uniformly dispersed throughout said article; substantially each of said voids intersecting with at least one adjacent void forming a substantially circular window at each intersection;

said voids affecting a theoretical density of said article: when said article has theoretical density in the range from 5% to 30%, the breaking strength of the article is in the range from 700 psi to 4500 psi;

the ceramic constituents of said article comprise zirconia, alumina, carbides of silicon, nitrides of silicon, oxides of silicon, mullite, or cordierite, or mixtures thereof.

2. An article as set forth in claim 1, wherein said article is substantially free from cracks.

3. An article as set forth in claim 1, wherein at least a portion of said article has a coating, whereby said coating will remain adhered to said article for at least 10 thermal cycles.

4. An article as set forth in claim 3, wherein said coating comprises a ceramic composition.

5. An article as set forth in claim 3, wherein a thermal cycle is from approximately room temperature to approximately 2200° F. and back to approximately room temperature in approximately 2 hours.

6. An article as set forth in claim 1, wherein the average diameter of said circular windows being in the range of approximately 11 microns to 22 microns.

* * * * *